US 011143403B2

United States Patent
Gaio et al.

(10) Patent No.: US 11,143,403 B2
(45) Date of Patent: Oct. 12, 2021

(54) SILO COMBUSTION CHAMBER AND METHOD FOR RETROFITTING SAME

(71) Applicant: Siemens Aktiengesellschaft, Munich (DE)

(72) Inventors: Giuseppe Gaio, Bonn (DE); Christian Jäkel, Duisburg (DE); Katrin Linnemann, Essen (DE); Maria de la Paz Mosquera Ruiz, Mülheim an der Ruhr (DE); Sonja Rehmann, Schwetzingen (DE); Petros Terzis, Düsseldorf (DE); Bernd Vonnemann, Gladbeck (DE); Michael Winterstein, Kaarst (DE)

(73) Assignee: SIEMENS ENERGY GLOBAL GMBH & CO. KG

( * ) Notice: Subject to any disclaimer, the term of this patent is extended or adjusted under 35 U.S.C. 154(b) by 8 days.

(21) Appl. No.: 16/607,524

(22) PCT Filed: Mar. 15, 2018

(86) PCT No.: PCT/EP2018/056489
§ 371 (c)(1),
(2) Date: Oct. 23, 2019

(87) PCT Pub. No.: WO2018/202350
PCT Pub. Date: Nov. 8, 2018

(65) Prior Publication Data
US 2020/0141580 A1    May 7, 2020

(30) Foreign Application Priority Data
May 3, 2017    (DE) .................... 10 2017 207 392.6

(51) Int. Cl.
| F23R 3/00 | (2006.01) |
| F23R 3/06 | (2006.01) |
| F23R 3/60 | (2006.01) |

(52) U.S. Cl.
CPC .............. *F23R 3/007* (2013.01); *F23R 3/002* (2013.01); *F05D 2240/35* (2013.01); *F23R 3/06* (2013.01);
(Continued)

(58) Field of Classification Search
CPC ... F23R 2900/03342; F23R 3/54; F23R 3/007
See application file for complete search history.

(56) References Cited

U.S. PATENT DOCUMENTS

| 5,419,114 A * | 5/1995 | Bauermeister .......... F01D 9/023 285/41 |
| 2009/0035124 A1 | 2/2009 | Bohrenkämper et al. |

(Continued)

FOREIGN PATENT DOCUMENTS

| DE | 4114768 A1 | 11/1991 |
| EP | 2428647 A1 | 3/2012 |

(Continued)

OTHER PUBLICATIONS

Translation of WO2015150095 (Year: 2015).*
(Continued)

*Primary Examiner* — Todd E Manahan
*Assistant Examiner* — Alyson Joan Harrington
(74) *Attorney, Agent, or Firm* — Schmeiser, Olsen & Watts LLP

(57) ABSTRACT

Provided is a silo combustion chamber comprising a vertically extending flame tube that can be lit from above and through which circulation takes place in a downward motion, the outer surface of the flame tube being provided with a plurality of cooling fluid supply openings and the (Continued)

inside thereof being lined with ceramic heat shield elements, the lowest heat shield elements being supported on a metal supporting ring; a conically tapered mixing tube arranged downstream from the flame tube, into which the lower region of the flame tube is set; and an outer housing that surrounds the flame tube and the mixing tube, forming an annular supply channel, the lowest heat shield elements completely covering the radially inwardly oriented surfaces of the supporting ring. Also provided is a method for retrofitting a silo combustion chamber.

7 Claims, 3 Drawing Sheets

(52) U.S. Cl.
CPC ....... *F23R 3/60* (2013.01); *F23R 2900/00017* (2013.01); *F23R 2900/03342* (2013.01)

(56) References Cited

U.S. PATENT DOCUMENTS

| | | | |
|---|---|---|---|
| 2009/0180873 | A1 | 7/2009 | Gruger et al. |
| 2012/0060503 | A1 | 3/2012 | Schnieder et al. |
| 2016/0201912 | A1* | 7/2016 | Larson .................... F23R 3/002 60/755 |
| 2017/0130961 | A1* | 5/2017 | Wilke ..................... F23R 3/045 |

FOREIGN PATENT DOCUMENTS

| | | | |
|---|---|---|---|
| RU | 2451241 C2 | | 5/2012 |
| WO | 2009053417 A2 | | 4/2009 |
| WO | WO 2009053417 A2 | | 4/2009 |
| WO | WO2015150095 | * | 8/2015 |

OTHER PUBLICATIONS

Abstract/Bibliographic Data Translation of WO2015150095 (Year: 2015).*
PCT International Search Report of International Searching Authority dated Jun. 26, 2018 corresponding to PCT International Application No. PCT/EP2017/065493 filed Mar. 15, 2018.
PCT International Search Report and Written Opinion of International Searching Authority dated Jun. 26, 2018 corresponding to PCT International Application No. PCT/EP2017/065493 filed Mar. 15, 2018.

* cited by examiner

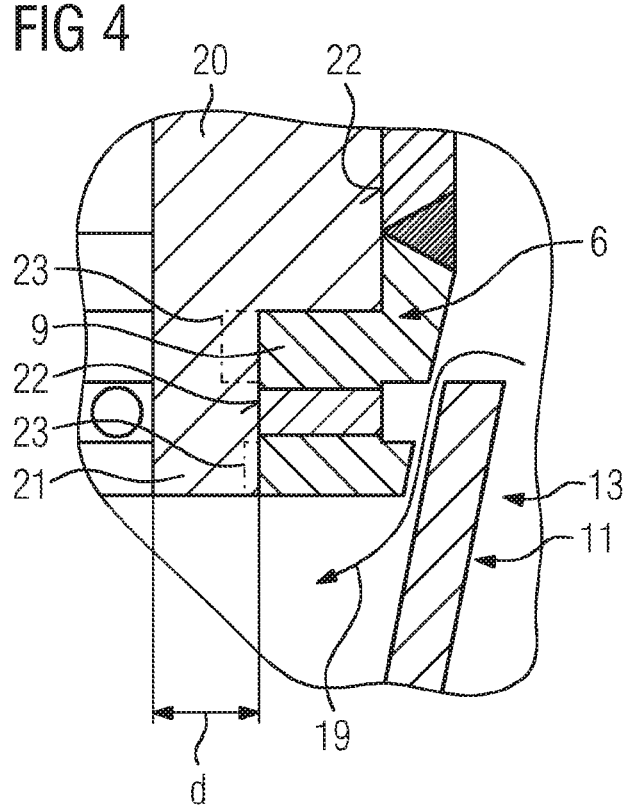

SILO COMBUSTION CHAMBER AND METHOD FOR RETROFITTING SAME

CROSS-REFERENCE TO RELATED APPLICATIONS

This application claims priority to PCT Application No. PCT/EP2018/056489, having a filing date of Mar. 15, 2018, which is based on German Application No. 10 2017 207 392.6, having a filing date of May 3, 2017, the entire contents both of which are hereby incorporated by reference.

FIELD OF TECHNOLOGY

The following concerns a silo combustion chamber comprising a vertically extending flame tube with downward throughflow which can be fired from above, the casing surface of which is provided with a plurality of cooling fluid supply openings and is lined internally with ceramic heat shield elements, wherein the lowest heat shield elements rest on a metallic supporting ring, a conically tapered mixing tube arranged downstream of the flame tube, into which the lower region of the flame tube is set, and an outer housing which surrounds the flame tube and the mixing tube, forming an annular supply channel.

BACKGROUND

Silo combustion chambers of the type described initially are known in the known art. For example, such a silo combustion chamber is used in the SGT5-2000E, a gas turbine type from Siemens A G. During operation of the gas turbine, initially an oxygen-containing working gas—usually in the form of air—is compressed by means of a compressor, wherein the temperature of the working gas rises, and its pressure increases. Then the working gas is introduced into the silo combustion chamber where it is heated further by corresponding firing inside the flame tube. The compressed and heated working gas is then supplied via the mixing tube to a turbine in which it performs mechanical work by its expansion, and hence drives the turbine via blades in the known fashion.

During operation, very high temperatures prevail inside the silo combustion chamber, wherein the highest temperatures occur inside the flame tube. To protect the flame tube from the high temperatures, heat shield elements are provided. In addition, the heat shield elements and the supporting ring are cooled. For cooling, partial volume flows of the working medium supplied to the silo combustion chamber via the supply channel are used; these are conducted firstly via the cooling fluid supply openings to the back of the heat shield elements. Secondly, they are conducted through cooling channels of the supporting ring which are formed in an unprotected region of the supporting ring below an annular support face arranged substantially horizontally, on which the lowest heat shield elements rest.

All partial volume flows of the working fluid used for the purpose of cooling entail a reduction in the efficiency of the turbo-machine. In this context, the aim is always to take measures which reduce the cooling needs of the silo combustion chamber or components thereof.

SUMMARY

An aspect relates to creating a silo combustion chamber of the type cited initially with an alternative design which leads to comparatively low cooling needs.

To achieve this aspect, the embodiments of the present invention provide a silo combustion chamber of the type cited initially, which is characterized in that the lowest heat shield elements completely cover the radially inwardly oriented surfaces of the supporting ring. Accordingly, in contrast to the known art, the regions of the supporting ring oriented toward the inside of the flame tube are completely protected by the heat shield elements. It has been found that, thanks to this design, no additional cooling of the metallic supporting ring is required, which leads to a reduction in the cooling fluid volume flow required for cooling and hence contributes to an increase in the efficiency of the turbomachine in which the silo combustion chamber according to the embodiments is used.

According to one embodiment of the present invention, the supporting ring has a circumferential support face extending substantially horizontally, on which the lowest heat shield elements each rest with a contact face, wherein the lowest heat shield elements have protrusions extending downwardly from the contact face and covering radially inwardly oriented surfaces of the supporting ring. Thanks to such protrusions, the radially inwardly oriented surfaces of the supporting ring can easily be covered completely while retaining a simple design of the heat shield elements.

The embodiments of the present invention furthermore concern a method for retrofitting a silo combustion chamber having a vertically extending flame tube with downward throughflow which can be fired from above, the casing surface of which is provided with a plurality of cooling fluid supply openings and is lined internally with ceramic heat shield elements, wherein the lowest heat shield elements rest on a metallic supporting ring which has a circumferential support face extending substantially horizontally, on which the lowest heat shield elements each rest with a contact face and which is provided with a plurality of radially extending cooling fluid bores, a conically tapered mixing tube arranged downstream of the flame tube, into which the lower region of the flame tube is set, and an outer housing which surrounds the flame tube and the mixing tube, forming an annular supply channel, comprising the steps:

a) removing the lowest heat shield elements, and
b) replacing the removed lowest heat shield elements with substitute heat shield elements which have protrusions extending downwardly from the contact face and covering parts of the inside of the supporting ring.

Thanks to the method according to the embodiments of the invention, by simple exchange of the lowest heat shield elements, the efficiency of turbo-machines in which the silo combustion chamber is used can be substantially improved since no additional cooling of the supporting ring is required.

According to one embodiment of the method according to embodiments of the invention, between steps a) and b), the cooling fluid bores of the supporting ring are closed, in particular by means of a welding process. In this way, undesirable leakage flows through the cooling fluid bores of the supporting ring during operation of the silo combustion chamber are prevented.

In a further step, the support face of the supporting ring is reduced by circumferential material removal in the radial direction. This means that the thickness of the protrusion, covering the supporting ring below its support face, of the respective substitute heat shield elements can be increased, whereby the thermally insulating effect of the substitute heat shield elements in this region is improved.

BRIEF DESCRIPTION

Some of the embodiments will be described in detail, with references to the following Figures, wherein like designations denote like members, wherein:

FIG. 4 shows an enlarged view similar to FIG. 2 after performance of a method according to a further embodiment of the present invention.

DETAILED DESCRIPTION

Figure 1:
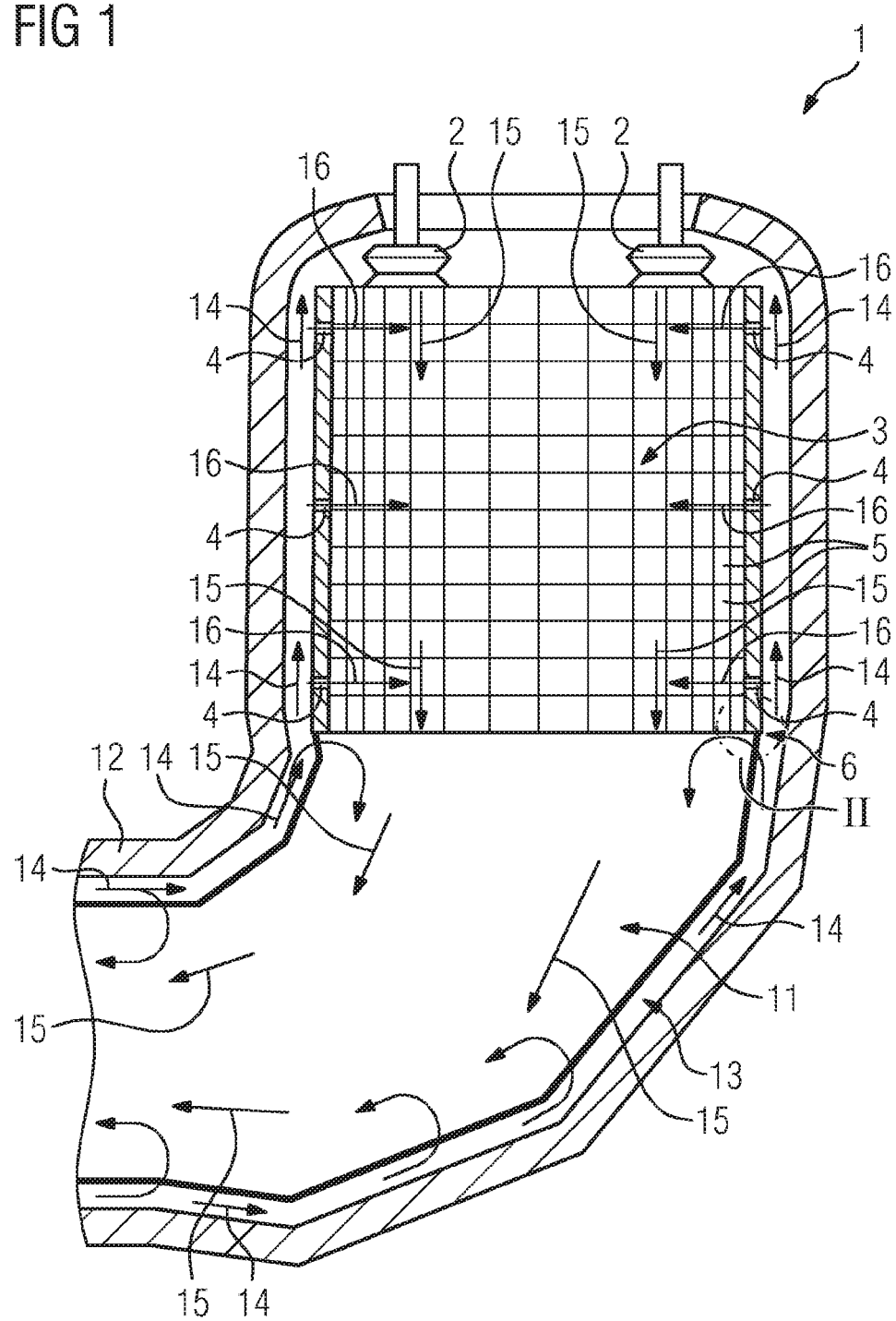
FIG. 1 shows a diagrammatic, sectional partial view of a silo combustion chamber.
Figure 2:
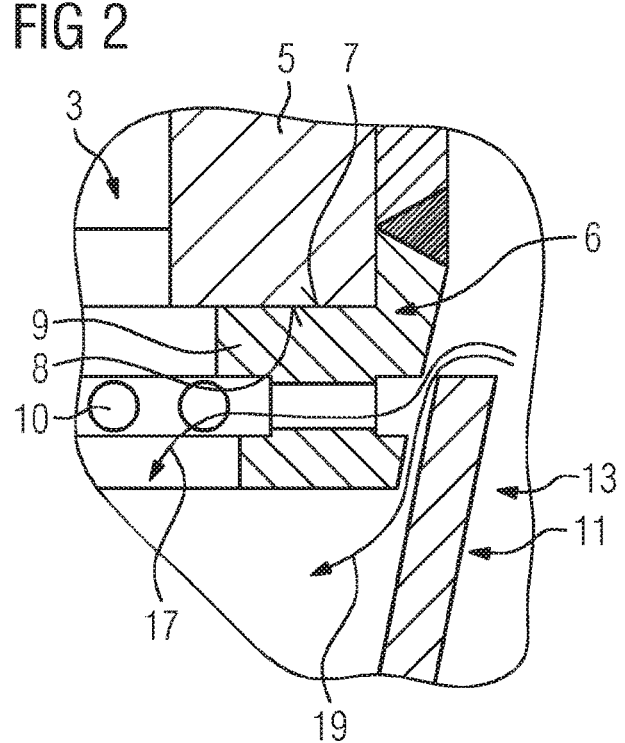
FIG. 2 shows an enlarged view of the extract marked with reference sign II in FIG. 1.

FIGS. 1 and 2 show partial regions of the known silo combustion chamber 1 as used for example in the SGT5-2000E, a gas turbine type from Siemens AG. The silo combustion chamber 1 comprises a vertically extending flame tube 3 with downward throughflow which can be fired from above via a multiplicity of burners 2, the casing surface of which flame tube is provided around its circumference with a plurality of cooling fluid supply openings 4 and is lined internally with ceramic heat shield elements 5. In the lower region of the flame tube 3, a metallic supporting ring 6 is provided, on which the lowest heat shield elements 5 rest. For this, the supporting ring 6 has a circumferential support face 7 extending substantially horizontally, on which the lowest heat shield elements 5 each rest with a contact face 8. The annular shoulder 9 of the supporting ring 6 which defines the support face 7 has, around its circumference, a plurality of cooling fluid bores 10 which each extend in the radial direction through the entire supporting ring 6. The silo combustion chamber 1 furthermore comprises a conically tapered, in the present case bent, mixing tube 11 which is arranged downstream of the flame tube 3 and into which the lower region of the flame tube 3 is set. As a further component, the silo combustion chamber 1 has an outer housing 12 which surrounds the flame tube 3 and the mixing tube 11, forming an annular supply channel 13.

During operation, an oxygen-containing working gas is compressed using a compressor (not shown in detail), wherein the temperature of the working gas rises and its pressure increases. The working gas is then conducted in the direction of the arrows 14 into the silo combustion chamber 1 via the supply channel 13 and supplied to the flame tube 3, where it is heated further by corresponding firing by means of the burners 2. The compressed and heated working gas is then supplied via the mixing tube 11 in the direction of the arrows 15 to a turbine (not shown in detail) in which it performs mechanical work by its expansion, and hence drives the turbine via blades.

To cool the heat shield elements 5, partial volume flows of the working gas conducted through the supply channel 13 are conducted through the cooling fluid supply openings 4 to the backs of the respective heat shield elements 5, from which they absorb heat; these volume flows then enter the flame tube 3 as indicated by the arrows 16 and are supplied to the turbine in the direction of the arrows 15. Further partial volume flows of the working gas are conducted through the cooling fluid bores 10 of the supporting ring 6 as indicated by arrows 17, and then supplied to the turbine in the direction of arrows 15.

A further partial volume flow passes through a ring gap 18 present between the supporting ring 6 and the mixing tube 11, as indicated by the arrow 19.

Figure 3:
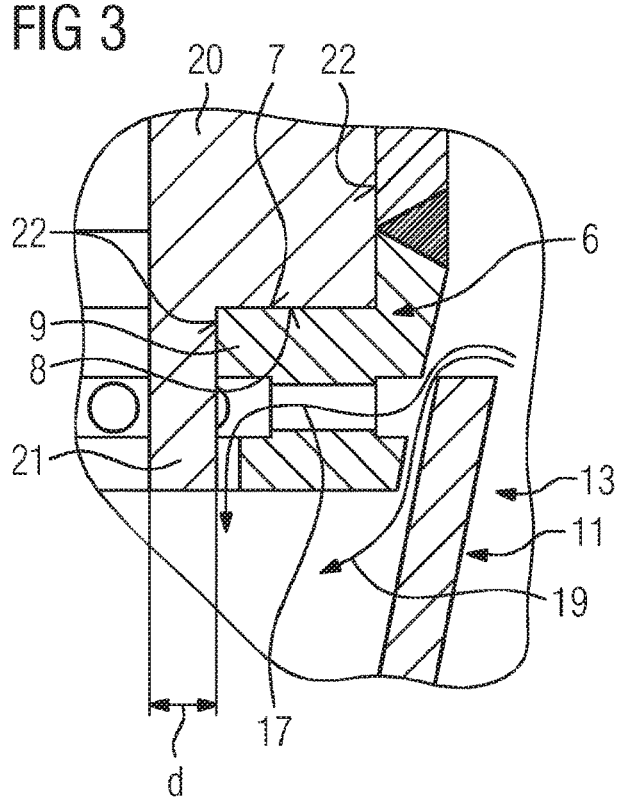
FIG. 3 is an enlarged view similar to FIG. 2 after performance of a method according to one embodiment of the present invention.

FIG. 3 shows a modification to the silo combustion chamber 1 in the region of the supporting ring 6 after performance of a method according to an embodiment of the present invention. In this method, the lowest heat shield elements 5 are removed in a first step. In a further step, the removed lowest heat shield elements 5 are replaced by substitute heat shield elements 20 which have protrusions 21 extending downwardly from the contact face 8 and covering the inside of the supporting ring 6. As a result, the substitute heat shield elements 20 now completely cover the radially inwardly oriented surfaces 22 of the supporting ring 6, so that the entire supporting ring 6 is protected from the high temperatures prevailing in the flame tube 3 by the substitute heat shield elements 20. As FIG. 3 shows, in this way the partial volume flow conducted through the supporting ring 6 is also reduced, whereby the efficiency of the turbo-machine in which the silo combustion chamber 1 is used is improved.

FIG. 4 shows a view similar to FIG. 3 which results after performance of a method according to a further embodiment of the present invention. In this variant, the lowest heat shield elements 5 are removed in a first step. In a second step, the support faces 7 of the supporting ring 6 are reduced by circumferential material removal in the radial direction, wherein the removed regions are still shown in FIG. 4 for greater clarity and designated with reference sign 23. In a third step, the cooling fluid bores 10 of the supporting ring 6 are closed, wherein in the present case a welding process is used. In a final step, the removed lowest heat shield elements 5 are replaced by substitute heat shield elements 20 which have protrusions 21 extending downwardly from their contact face 8 and covering the inside of the supporting ring.

The arrangement depicted in FIG. 4 is advantageous in comparison with the arrangement depicted in FIG. 3 firstly in that the partial volume flows conducted through the supporting ring 6 are completely eliminated. Furthermore, the thickness d of the protrusion 21, covering the supporting ring 6 below its support face 7, of the substitute heat shield element 20 shown in FIG. 4, is greater than the corresponding thickness d of the protrusion 1 depicted in FIG. 3; this is achieved by means of the material removal performed in the third method step. In this way, the thermally insulating effect of the substitute heat shield elements 20 in the lower region of the supporting ring 6 is improved.

In the arrangement depicted in FIG. 3 also, the cooling fluid bores 10 of the supporting ring 6 may be closed in a further method step, to cite just one example.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A silo combustion chamber comprising:
   a vertically extending flame tube with downward throughflow which can be fired from above, a casing surface of which is provided with a plurality of cooling fluid supply openings and is lined internally with a plurality of ceramic heat shield elements, wherein a plurality of lowest heat shield elements of the plurality of ceramic heat shield elements rest on a metallic supporting ring;

a conically tapered mixing tube arranged downstream of the vertically extending flame tube, into which a lower region of the vertically extending flame tube is set; and an outer housing which surrounds the vertically extending flame tube and the conically tapered mixing tube, forming an annular supply channel, wherein the plurality of lowest heat shield elements of the plurality of ceramic heat shield elements completely cover a radially inwardly oriented surface of the metallic supporting ring, wherein the plurality of lowest heat shield elements of the plurality of ceramic heat shield elements reduce a partial volume flow of a working gas through the metallic supporting ring.

2. The silo combustion chamber as claimed in claim 1, wherein the metallic supporting ring has a circumferential support face extending horizontally, on which the plurality of lowest heat shield elements each rest with a contact face, and wherein the plurality of lowest heat shield elements each have a protrusion extending downwardly from the contact face and covering the radially inwardly oriented surface of the metallic supporting ring.

3. A method for retrofitting a silo combustion chamber having a vertically extending flame tube with downward throughflow which can be fired from above, a casing surface of which is provided with a plurality of cooling fluid supply openings and is lined internally with a plurality of ceramic heat shield elements, wherein a plurality of lowest heat shield elements of the plurality of ceramic heat shield elements rest on a metallic supporting ring which has a circumferential support face extending horizontally, on which the plurality of lowest heat shield elements of the plurality of ceramic heat shield elements each rest with a contact face and the metallic supporting ring is provided with a plurality of radially extending cooling fluid bores, a conically tapered mixing tube arranged downstream of the vertically extending flame tube, into which a lower region of the vertically extending flame tube is set, and an outer housing which surrounds the vertically extending flame tube and the conically tapering mixing tube, forming an annular supply channel, comprising the steps:

a) removing the plurality of lowest heat shield elements of the plurality of ceramic heat shield elements, and b) replacing the removed plurality of lowest heat shield elements with a plurality of substitute heat shield elements which each have a protrusion extending downwardly from the contact face and covering parts of the inside of the metallic supporting ring, wherein the plurality of substitute heat shield elements completely cover a radially inwardly oriented surface of the metallic supporting ring and reduce a partial volume flow of a working gas through the metallic supporting ring.

4. The method as claimed in claim 3, wherein between steps a) and b), the cooling fluid bores of the metallic supporting ring are closed, by means of a welding process.

5. The method as claimed in claim 3, wherein in a further step, the circumferential support face of the metallic supporting ring is reduced by circumferential material removal in a radial direction.

6. The silo combustion chamber as claimed in claim 1, wherein reducing the partial volume flow of the working gas through the metallic supporting ring provides improved efficiency.

7. The silo combustion chamber as claimed in claim 1, wherein there is no flow of a working gas through the metallic supporting ring.

\* \* \* \* \*